(12) United States Patent
Uchimura

(10) Patent No.: US 7,024,178 B2
(45) Date of Patent: Apr. 4, 2006

(54) SHORT MESSAGE DELIVERY SYSTEM

(75) Inventor: Ayaka Uchimura, Tokyo (JP)

(73) Assignee: NEC Corporation, Tokyo (JP)

( * ) Notice: Subject to any disclaimer, the term of this patent is extended or adjusted under 35 U.S.C. 154(b) by 379 days.

(21) Appl. No.: 10/223,243

(22) Filed: Aug. 20, 2002

(65) Prior Publication Data

US 2003/0050080 A1    Mar. 13, 2003

(30) Foreign Application Priority Data

Sep. 13, 2001  (JP) ............................ 2001/277848

(51) Int. Cl.
*H04L 12/58* (2006.01)
(52) U.S. Cl. .................... 455/412.1; 455/466; 455/512
(58) Field of Classification Search ................ 455/466, 455/435, 412.1
See application file for complete search history.

(56) References Cited

U.S. PATENT DOCUMENTS

| | | | | |
|---|---|---|---|---|
| 5,719,918 | A * | 2/1998 | Serbetciouglu et al. | 380/271 |
| 5,872,779 | A * | 2/1999 | Vaudreuil | 370/352 |
| 5,878,351 | A * | 3/1999 | Alanara et al. | 455/466 |
| 5,884,170 | A * | 3/1999 | Valentine et al. | 455/433 |
| 6,006,303 | A * | 12/1999 | Barnaby et al. | 710/244 |
| 6,134,432 | A * | 10/2000 | Holmes et al. | 455/412.1 |
| 6,230,019 | B1 * | 5/2001 | Lee | 455/466 |
| 6,263,212 | B1 * | 7/2001 | Ross et al. | 455/466 |
| 6,493,558 | B1 * | 12/2002 | Bernhart et al. | 455/466 |
| 6,522,634 | B1 * | 2/2003 | Ohashi | 370/280 |
| 6,763,240 | B1 * | 7/2004 | Chambers et al. | 455/466 |
| 2002/0173308 | A1 * | 11/2002 | Dorenbosch et al. | 455/435 |

FOREIGN PATENT DOCUMENTS

| | | |
|---|---|---|
| CN | 1 231 783 A | 10/1999 |
| EP | 1 259 036 A1 | 11/2002 |
| JP | 5-308377 A | 11/1993 |
| JP | 2000-201223 A | 7/2000 |
| JP | 2000-270039 A | 9/2000 |
| JP | 2000-349928 A | 12/2000 |
| WO | WO 02/09360 A1 | 1/2002 |

OTHER PUBLICATIONS

English Abstract for JPA No. 11-252103, published Sep. 17, 1999.
English Abstract for JPA No. 43-26225, published Nov. 16, 1992.
English Abstract for JPA No. 62-82502, published Oct. 7, 1994.

* cited by examiner

*Primary Examiner*—William Trost
*Assistant Examiner*—Ariel Balaoing
(74) *Attorney, Agent, or Firm*—Sughrue Mion, PLLC

(57) ABSTRACT

A short message delivery system has: mobile terminal devices each having a function of generating and receiving a short message; ground facilities each including a radio station connected to a mobile terminal device by radio means; and a short message center for receiving the short message issued from a mobile terminal device via a ground facility and transmitting the received short message to a specified transmission destination. The short message center includes retry means responsive to a failure of the transmission of the short message for retrying the transmission according to a communication state of a mobile terminal device of reception side and a term of validity of preservation of the short message.

3 Claims, 3 Drawing Sheets

SHORT MESSAGE DELIVERY SYSTEM

FIELD OF THE INVENTION

The present invention relates to a short message delivery system, and in particular to a short message delivery system capable of certainly delivering a short message to a transmission destination in transmitting the short message by using a mobile telephone such as a portable telephone.

BACKGROUND OF THE INVENTION

The portable telephone system is not limited to speech communication, but service capable of transmitting mail using characters by especially making a contract has been heretofore spread under, for example, the name of "short mail." As a result, it is possible to conduct mail transmission similar to E mail using a personal computer or the like, from a mobile terminal such as a portable telephone. As a system of portable telephone of the next generation, which can be used in a plurality of countries, replacing the existing communication system which takes a country as the unit, systems according to IMT (International Mobile Telecommunication) 2000 (or W-CDMA) and CDMA (Code Division Multiple Access) are about to be put to practical use. In these systems, transmission of mail called "short message" becomes possible.

As for the short message, a mobile terminal device of a transmission source (hereafter it is supposed that a mobile telephone is used) sends a created message and data of a transmission destination to a message center, and the message center transmits the message to a portable telephone of the transmission destination. Even in the case where the message is not delivered to the opposite party, the message center, for example, preserves the message in a server for several days, and transmits the message automatically or in response to a transmission request issued by the user. After the message center has transmitted the message, it erases the already transmitted message. The message center preserves a message that is not transmitted yet for a predetermined number of days, i.e., the term of validity.

Even if a message is transmitted from the message center in such a system, the message is not received normally by a portable telephone of transmission destination in some cases according to the state of the portable telephone of the transmission destination (such as, for example, a state in which power is turned off and the portable telephone is left as it is, or a state in which the user stays in an area where communication is impossible). Heretofore, therefore, proposals for ensuring delivery have been effected.

For example, in Japanese Patent Application Laid-Open No. 2000-201223, a radio wave reception level is measured for transmission and mail transmission is conducted only in the state in which transmission is possible. When communication is impossible, transmission mail is preserved. The radio wave reception level is monitored. Only when the reception level has improved, reception is conducted. Thereby, the success rate of mail reception is raised. In Japanese Patent Application Laid-Open No. 2000-349928, there is provided, besides setting means for setting transmission (information to be transmitted, transmission time, and transmission destination), a transmission information storage memory for storing the transmission information when the transmission information cannot be transmitted. When the transmission time corresponding to the contents stored in the memory is reached, the information is transmitted to the pertinent transmission destination. Retransmission can be thus conducted. Furthermore, in Japanese Patent Application Laid-Open No. 2000-270039, a check is effected to determine whether there is an error in received data when a terminal device receives a message. When there is an error, data retransmission is requested. It is thus ensured that a correct message will be transmitted to the terminal device side certainly.

However, the conventional message delivery system cannot cope with situations where the mobile terminal device of transmission destination is not in the operation state or the reception is impossible. For example, when the mobile telephone is left as it is with power in the off-state or the mobile telephone stays in an area where communication is impossible for many hours, the mobile telephone of the transmission destination cannot receive a short message from the message center. If the validity term of mail storage in the message center has expired in this state, then the message becomes invalid and the message is discarded in the message center and the message is not sent to the transmission destination. As a result, there occur situations where the message is not actually delivered although the message is expected on the transmission source side to be delivered. If the message to be transmitted contains important contents, there might occur a situation where a business chance is missed.

SUMMARY OF THE INVENTION

Therefore, an object of the present invention is to provide a short message delivery system in which short message can be delivered to transmission destinations certainly.

In order to achieve the object, the present invention provides a short message delivery system including: mobile terminal devices each having a function of conveying speech or communication from a place where the mobile terminal device is staying by radio means, and a function of generating and receiving a short message; ground facilities each including a radio station connected to a mobile terminal device by radio means; and a short message center for receiving the short message issued from a mobile terminal device via a ground facility and transmitting the received short message to a specified transmission destination, the short message center including retry means responsive to a failure of the transmission of the short message for retrying the transmission according to a communication state of a mobile terminal device of reception side and a term of validity of preservation of the short message.

According to this system, a short message input from a mobile terminal device is sent to a short message center. The short message is transmitted from the short message center to a mobile terminal device of a specified transmission destination. When the transmission cannot be terminated normally, a retry of the transmission is conducted. This retry is executed on the basis of a communication state (temporary error) of a mobile terminal device of reception side, and the term of validity (the term of message preservation) of short messages in the short message center. Therefore, an optimum condition is set according to situations and a retry is effected. As a result, it becomes possible to transmit a short message to the transmission destination certainly.

DESCRIPTION OF THE EXEMPLARY EMBODIMENTS

Hereafter, exemplary embodiments of the present invention will be described by referring to accompanying drawings.

Figure 1:
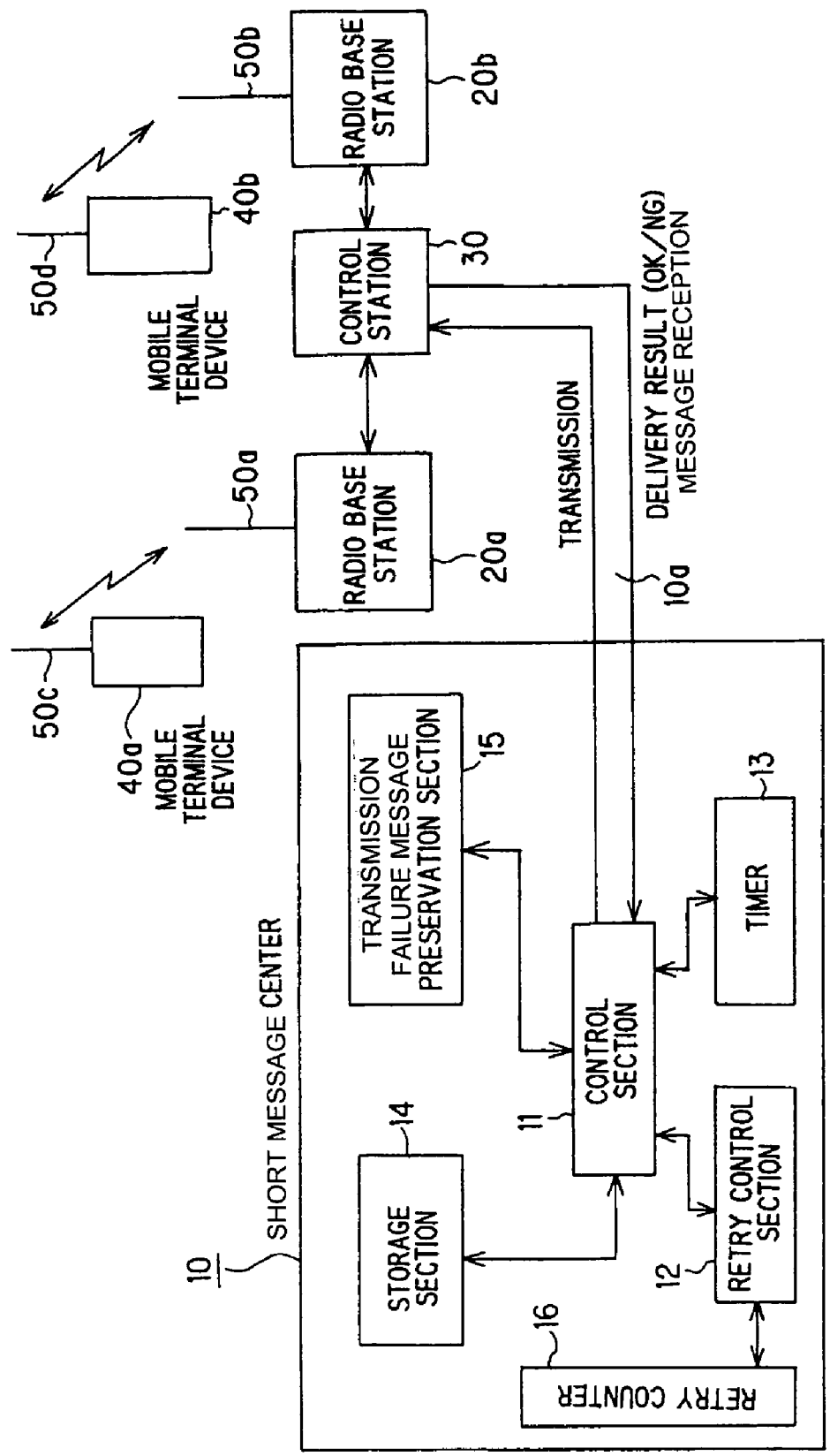
FIG. 1 is a block diagram showing a short message delivery system according to the present invention.

FIG. 1 shows a short message delivery system according to the present system.

A short message delivery system includes a short message center (SC) 10, radio base stations 20a and 20b, a control station 30 for managing the radio base stations and effecting connections to other various stations and a fixed telephone network, and mobile terminal devices 40a and 40b each radio-connected to the radio base station 20a or 20b.

It is now supposed that portable telephones are used as the mobile terminal devices 40a and 40b. It is also supposed that the mobile terminal device 40a is used by a transmission source and the mobile terminal device 40b is used by a transmission destination. It is also supposed that the mobile terminal device 40a is connected to the radio base station 20a and the mobile terminal device 40b is connected to the radio base station 20b. Characters 50a, 50b, 50c and 50d denote antennas. In FIG. 1, two radio stations, one control station, and two mobile terminal devices are shown. As a matter of fact, however, a large number of radio stations, control stations, and mobile terminal devices exist.

The short message center 10 includes a control section 11 connected to the control station 30 via signal lines 10a, a retry control section 12 connected to the control section 11, a timer 13, a storage section 14 for storing a message supplied from the mobile terminal device 40a, a transmission failure preservation section 15, and a retry counter 16 connected to the retry control section 12.

The control section 11 has a function of controlling the whole in the short message center 10, receiving a short message from the control station 30, and sending a short message to be transmitted, to the control station 30. When a transmitted short message is not received at the transmission destination, the retry control section 12 executes control for conducting retransmission. The timer 13 is used to set an interval of the retry (a delivery interval). A storage medium such as a hard disk is used in the storage section 14. In the same way, a storage medium such as a hard disk is used in the transmission failure message preservation section 15 to preserve a short message transmission of which has failed, to provide for retry. Priorities (transmission orders) are set and stored in the transmission failure message preservation section 15 together with messages that have not transmitted yet and transmission information (such as the term of validity and the number of times of retry). Furthermore, lists for retry as shown in TABLE 1 are stored in the transmission failure message preservation section 15. The retry counter 16 counts the number of times of retransmission conducted by the short message center 10.

TABLE 1

| Priority | Message | Term of validity | Number of times of retry |
|---|---|---|---|
| First priority | No. 1 | One day | 2 |
|  | No. 2 | Two days | 1 |
| Second Priority | No. 3 | Four days | 1 |
|  | No. 4 | Three days | 1 |
| . | . | . | . |

TABLE 1-continued

| Priority | Message | Term of validity | Number of times of retry |
|---|---|---|---|
| . | . | . | . |
| . | . | . | . |
| Nth priority | No. N | Three days | 0 |

Figure 2:
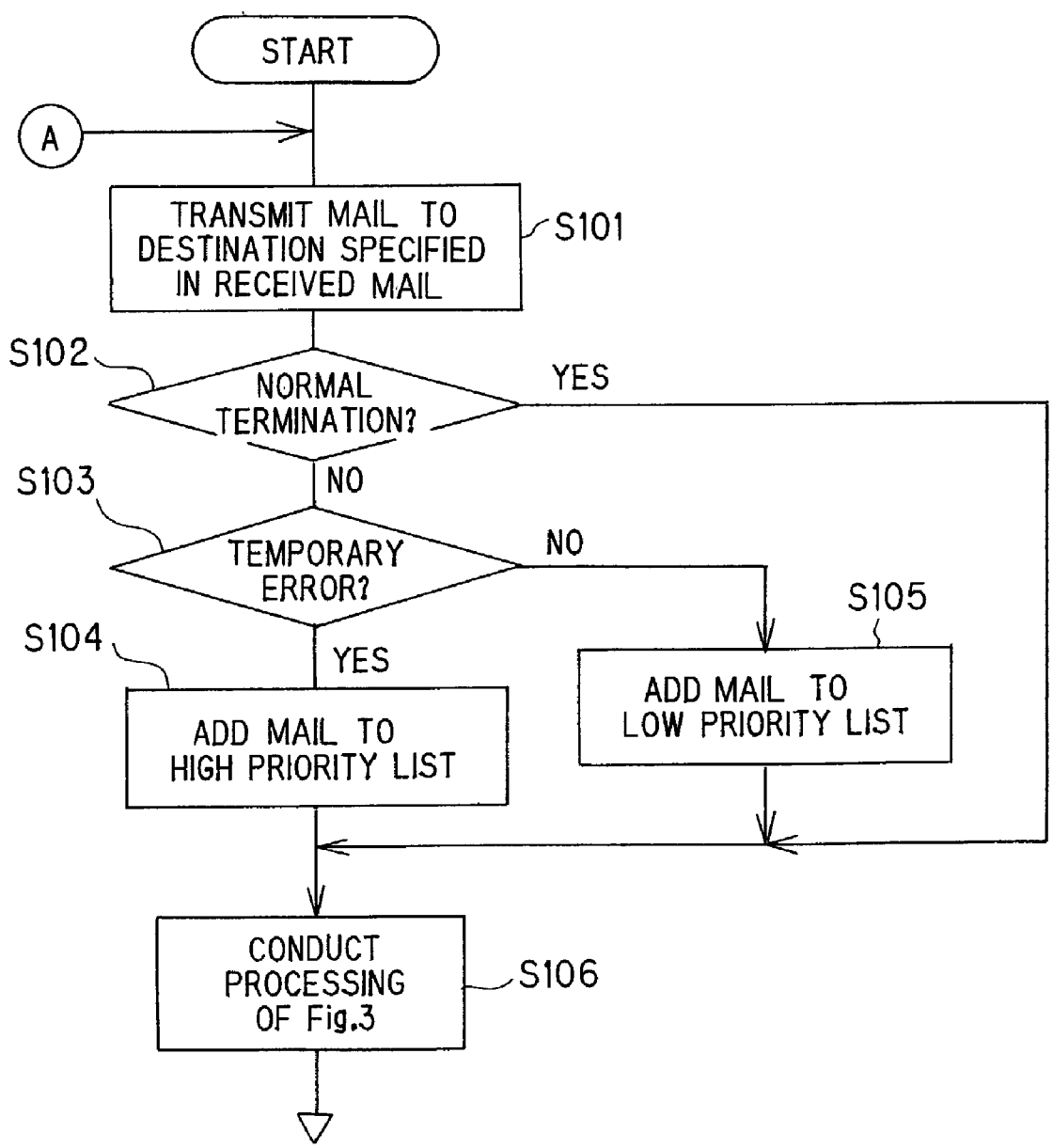
FIG. 2 is a flow chart showing mail transmission processing conducted in a short message center.

FIG. 2 shows mail transmission processing conducted in the short message center of FIG. 1. This processing is processing conducted when transmitting a short message newly from the short message center 10 (i.e., conducted at the time of first transmission). S in FIG. 2 stands for "step."

The mobile terminal device 40a of the transmission source is connected to the radio station 20a. A short message from the mobile terminal device 40a is input to the short message center 10 via the radio base station 20a and the control station 30. The control section 11 in the short message center 10 stores the short message in the storage section 14. Thereafter, the short message center 10 reads out the short message to be transmitted, from the storage section 14 by using the control section 11 and transmits the short message to the control station 30. The short message input from the short message center 10 to the control station 30 is transmitted from the radio base station 20b to the mobile terminal device 40b of transmission destination (S101). The short message center effects a check via the control station 30 to determine whether the transmitted short message has arrived at the mobile terminal device 40b normally (S102). If normal termination is judged, then the mail transmission processing is finished. If normal termination is not judged at the S102, then it is determined whether its cause is a temporary error of the reception side (S103). In the case of a temporary error, the short message the transmission of which has failed is added to the list of high priority (e.g., redelivery interval of 30 minutes) in the transmission failure message preservation section 15 and preserved in the transmission failure message preservation section 15 (S104). In the case of a temporary error, the situation is considered to be high in possibility that the mobile terminal device 40b is brought into a ready to receive state (i.e., a transmission finishing state) by retransmission. Therefore, the priority is raised (i.e., the redelivery interval (or the retransmission interval) is shortened in order to finish the transmission earlier. On the other hand, if the error is not a temporary error, the short message transmission of which has failed is added to the list of low priority (redelivery interval of 3 hours) and preserved in the transmission failure message preservation section 15 (S105). On the basis of the lists (contents of TABLE 1, the short message center executes processing shown in FIG. 3.

Figure 3:
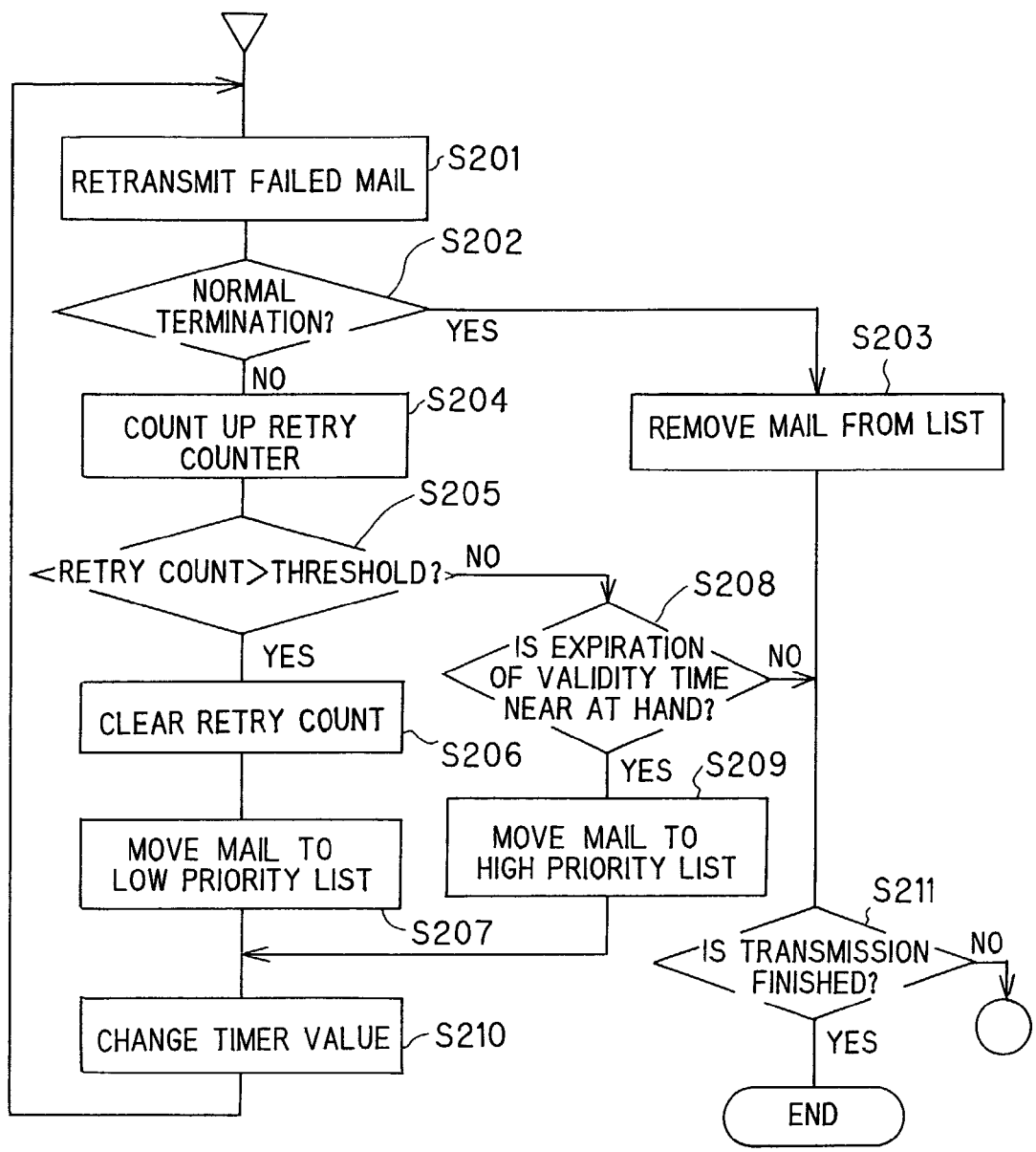
FIG. 3 is a flow chart showing mail transmission processing conducted when transmission has failed.

FIG. 3 shows mail transmission processing conducted when transmission has failed.

The short message center 10 activates the control section 11 and the retry control section 12, reads out a short message to be transmitted, from the transmission failure message preservation section 15 according to the priority, sends the short message to the control station 30, and automatically redelivers the short message at predetermined intervals. The interval in this case depends on the priority. The higher priority the message has, the shorter the interval of automatic retransmission is made (S201). It is determined whether the mail transmission has finished normally as a result (S202). If mail transmission has finished normally, then the short message is deleted from the list, i.e., from the transmission failure message preservation section 15 (S203).

It is determined whether there is another message to be transmitted (S211). If there is another message to be transmitted, then the processing is returned to S101 of FIG. 1.

If the mail transmission has not finished normally ("NO" of S202), then the retry counter 16 in the retry control section 12 counts up (S204). Then the retry control section 12 compares the count in the retry counter 16 with a threshold (for example, five) (S205), and determines whether the relation "count>threshold" is satisfied (S206). If the relation "count>threshold" is satisfied, then the transmission failure is judged not to be caused by a temporary error. Because the number of times of retry has exceeded a predetermined value although the priority is raised at S105 of FIG. 2 on the basis of the judgment of the temporary error and redelivery is effected. Therefore, the count in the retry counter 16 is cleared and the short message is provided with the original priority (S206). The short message is delivered at long intervals (S207).

On the other hand, if it is found at S205 that the relation "count≦threshold" is satisfied, then it is determined whether the term of validity (the term of preservation) is near at hand (S208). In an expiration stage of the term of validity, there is a fear that the short message will not be delivered and the retry will be finished because the time runs out. Therefore, the priority is raised and redelivery is conducted at short intervals so as to complete the transmission (S209). After execution of the processing of S209 and S207, the value of the timer 13 is changed (S210), and then the processing is returned to S201 and subsequent processing is executed again.

According to the embodiment of the present invention, the retry function is provided as heretofore described and the number of times of retry can be adjusted according to the communication state of the mobile terminal device of the transmission destination of the short message and the term of validity of the short message. To be concrete, if the communication state is aggravated and the communication has failed, then retry is conducted to raise the probability of success and the retry interval (redelivery interval) is shortened. Furthermore, for a message having the term of validity that is near at hand, the transmission priority is raised and retry processing is conducted, or the retry interval (redelivery interval) is shortened. It thus becomes possible to prevent the message from disappearing due to expiration of the term of validity, and deliver the mail to the transmission destination certainly. Furthermore, since the success probability of delivery (transmission) is increased, it becomes possible to prevent a large quantity of messages from being stored (preserved) in the storage section 14 of the short message center 10.

As evident from the foregoing description, the short message delivery system of the present invention includes mobile terminal devices, facilities including radio base stations, and a short message center. When transmission of a short message from the short message center to a mobile terminal device of a specified transmission destination cannot be conducted normally, retries are conducted by taking the communication state of the mobile terminal device of the reception side and the validity term of the short message. As a result, the short message can be delivered to the transmission destination certainly.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching herein set forth.

What is claimed is:

1. A message delivery system comprising:
   mobile terminal devices, each configured to convey speech or communication from a place where the mobile terminal device is located by radio means, and to generate and receive a message;
   ground facilities, each including a radio station connected to a mobile terminal device by radio means; and
   a message center configured to receive the message issued from a mobile terminal device via a ground facility and transmit the received message to a specified transmission destination, the message center including retry means responsive to a failure of the transmission of the message configured to retry the transmission according to a communication state of a mobile terminal device of reception side and a term of validity of preservation of the message,
   wherein the retry means comprises:
      a transmission failure message preservation section configured to provide a message transmission which has failed with transmission information, set a priority, and store the message;
      a retry control section configured to control retry transmission of the message transmission which has failed;
      a timer configured to set an interval of the retry;
      a retry counter configured to count the number of times of execution of the retry; and
      a control section configured to control reception and transmission of the message and to manage the whole retry means, and
   wherein
      the retry means is configured to change the number of times of retry according to a communication state of a mobile terminal device of a transmission destination of the message and a term of validity of the message;
      the retry means is configured to shorten the retry interval when a communication failure is judged to be an occurrence of temporary error due to the communication state;
      the retry means is configured to execute the retry a preset number of times;
      the retry means is configured to change the priority of the retry to a high value when the term of validity is near at hand; and
      the retry a low value when the number of times of the retry has exceeded the preset number of times.

2. The message delivery system according to claim 1, wherein
   the retry means is configured to execute the retry a preset number of times,
   the retry means is configured to change the priority of the retry to a high value when the term of validity is near at hand; and
   the retry means clear a retry count value and changes the priority of the retry to a low value when the number of times of the retry has exceeded the preset number of times.

3. The message delivery system according to claim 1, wherein the mobile terminal device is a portable telephone.

* * * * *